United States Patent Office 2,748,089
Patented May 29, 1956

2,748,089

PROCESS FOR INHIBITING FOAM

Louis T. Monson, Puente, Calif., assignor to Petrolite Corporation, a corporation of Delaware No Drawing. Application December 18, 1951,
Serial No. 262,323

5 Claims. (Cl. 252—321)

This invention relates to a process for reducing or destroying foam or inhibiting its formation, in compositions of either aqueous or non-aqueous nature.

Foams occur as undesirable, incidental features in many industrial processes. The theory of their formation is not highly developed; so that hypotheses on which foam reduction or destruction processes might be based are difficult to formulate. As a consequence, foam-destroying agents are usually devised for use in the case of particular foams.

I have discovered a novel process of reducing or destroying foams and of preventing their formation, which appears to be relatively general in applicability, in that it may be used on compositions comprising aqueous materials or solutions; on compositions comprising non-aqueous materials, such as hydrocarbon liquids; and on compositions comprising mixtures of aqueous and non-aqueous media. My process consists in subjecting a foaming or potentially-foaming composition to the action of a small proportion of a reagent or anti-foamer of the kind subsequently described, thereby causing the foaming properties of the liquid to be diminished, suppressed or destroyed. In applying my process to the reduction or destruction of a foam, the reagent may be poured or sprayed or dipped into the body of foam on top the liquid, as desired; and the foam breaks and is destroyed or reduced, substantially at once, as a consequence of such addition of said reagent. Adding the reagent to the liquid underlying such already-formed foam is also practicable. In applying my process to the prevention of foaming, the reagent is admixed, in some small proportion, with a potentially-foaming liquid, by any desired or suitable procedure. The ability of the system to foam is destroyed or at least materially reduced by such addition of said reagent.

The reagents employed in my present process are a particular class of oxyalkylated and acylated basic aminoalcohols in which an acyloxy radical derived from a detergent-forming monobasic acid having from 8 to 32 carbon atoms is joined to a basic nitrogen by a carbon atom chain or by a carbon atom chain which is interrupted at least once by an oxygen atom. The aminoalcohols may have more than one amino radical or, for that matter, more than one basic amino radical. Stated another way, the intermediate materials from which my reagents are derivable by oxyalkylation are esters of aminoalcohols which may contain ether linkages as well as more than one amino nitrogen atom.

Reference to a basic amino nitrogen atom is used in its conventional sense. ("Unsaturated groups, or negative groups, if substituted for one or more of the hydrogens of ammonia, reduce the basicity of the nitrogen atom to a remarkable degree. In general, the presence of one negative group linked on the nitrogen is sufficient to destroy the ordinary basic properties." Textbook of Organic Chemistry, Richter, second edition, page 253.)

Reference to an amine and the subsequent amino compounds is intended to include the salts and the anhydro base, as well as the hydrated base, where water is present. ("In an aqueous solution of the amine, the anhydro base, R—NH₂, the hydrated base, R—NH₃—OH, and the two ions are all present." Richeter, s. v., page 252.)

The intermediate materials from which my derivatives may be prepared by oxyalkylation are well known products. Reference is made to U. S. Patents Nos. 2,324,488; 2,324,489; and 2,324,490, all dated July 20, 1943, to DeGroote and Keiser. While those patents all relate to demulsification processes, the demulsifying agent employed is in each case the resultant derived by reaction between a certain fractional ester and an acylated aminoalcohol. The acylated aminoalcohols described collectively in said three patents are required to possess an alcoholiform hydroxyl group inasmuch as they are there subsequently to be reacted with an acidic fractional ester. In the present case, such acylated aminoalcohols are not required to be reacted with such acidic reactant; but they are to be subjected to oxyalkylation, and hence must contain an oxyalkylation-susceptible radical or group. In most cases, such radical will be a hydroxyl radical in the parent aminoalcohol; but where the acyl group is itself hydroxyl-containing, as is the case with the ricinoleyl group, there need be no residual hydroxyl group in the aminoalcohol residue present in the acylated aminoalcohol.

Acylation of the parent aminoalcohol to produce my intermediate compounds is accomplished by means of high molal monocarboxyacids, commonly referred to as detergent-forming monocarboxy acids. The description of these which appears in aforementioned U. S. Patent No. 2,324,490, is adopted here. It is as follows:

"It is well known that certain monocarboxy organic acids containing eight carbon atoms or more, and not more than 32 carbon atoms, are characterized by the fact that they combine with alkalis to produce soap or soap-like materials. These detergent-forming acids include fatty acids, resin acids, petroleum acids, etc. For the sake of convenience, these acids will be indicated by the formula R.COOH. Certain derivatives of detergent-forming acids react with alkali to produce soap or soap-like materials, and are the obvious equivalent of the unchanged or unmodified detergent-forming acids, for instance, instead of fatty acids, one might employ the chlorinated fatty acids. Instead of the resin acids, one might employ the hydrogenated resin acids. Instead of naphthenic acids, one might employ brominated naphthenic acids, etc.

"The fatty acids are of the type commonly referred to as higher fatty acids; and of course this is also true in regard to derivatives of the kind indicated, insofar that such derivatives are obtained from higher fatty acids. The petroleum acids include not only naturally-occurring naphthenic acids, but also acids obtained by the oxidation of wax, paraffin, etc. Such acids may have as many as 32 carbon atoms. For instance, see U. S. Patent No. 2,242,837, dated May 20, 1941, to Shields."

The intermediate composition subsequently to be oxyalkylated for use in my process is preferably derived from unsaturated fatty acids having 18 carbon atoms. Such unsaturated fatty acids include oleic, ricinoleic, linolic, linolenic, etc. One may employ mixed fatty acids, for example, those obtained by hydrolysis of cottonseed oil, soybean oil, etc. Tall oil, comprising principally a mixture of oleic and rosin acids, is a cheap and useful form of detergent-forming monocarboxy acids. The synthetic carboxylic acids obtained by the alkali treatment of high molal alcohols, formed in the catalytic hydrogenation of carbon monoxide, is also a useful reactant here.

One need not use the high molal carboxy acid, such as a fatty acid, for introducing the acyl or acyloxy group. Any suitable functional equivalent, such as the acyl halide, anhydride, ester, amide, etc., may be employed. The oils and fats are commonly usable instead of their free fatty acids.

Primary and secondary amines which are suitable reactants to produce the acylated intermediate here include the following: Diethanolamine, monoethanolamine, ethyl ethanolamine, methyl ethanolamine, propanolamine, dipropanolamine, propylpropanolamine, etc. Other examples include cyclohexylolamine, dicyclohexylolamine, cyclohexylethanolamine, cyclohexylolpropanolamine, benzylethanolamine, benzylpropanolamine, pentanolamine, hexanolamine, octylethanolamine, octadecylethanolamine, cyclohexanolethanolamine, etc.

Similarly, suitable tertiary amines which may be employed include the following: Triethanolamine, diethanolalkylamines such as diethanolethylamine, diethanolpropylamine, etc. Other examples include diethanolmethylamine, tripropanolamine, dipropanolmethylamine, cyclohexanoldiethanolamine, dicyclohexanolethanolamine, cyclohexyldiethanolamine, dicyclohexanolethylamine, benzyldiethanolamine, benzyldipropanolamine, tripentanolamine, trihexanolamine, hexyldiethanolamine, octadecyldiethanolamine, etc.

Additional amines which may be used when the acylating reactant is hydroxyl-containing include ethanoldiethylamine, propanoldiethylamine, ethanoldipropylamine, propanoldiproplyamine, ethanoldicyclohexylamine, cyclohexanoldiethylamine, dibenzylethanolamine, etc.

Ether-type aminoalcohols may be obtained from the above-mentioned aminoalcohols, for example, by treating them with one or more moles of an oxyalkylating agent such as ethylene oxide, propylene oxide, butylene oxide, glycid or methylglycid.

To prepare the acylated aminoalcohol intermediate, one simply heats together the desired aminoalcohol and the desired acylating reactant. The following examples illustrate this step in the preparation of my reagents.

ACYLATED AMINOALCOHOL

Example 1

Heat one pound mol of ricinoletic acid and one pound mol of triethanolamine with stirring for 10 to 25 hours at 180–250° C., until there is substantially complete esterification.

Example 2

Substitute methyl naphthenate for the ricinoleic acid of Example 1 above.

Example 3

Substitute methyl abietate for the ricinoleic acid of Example 1 above.

Example 4

Substitute ethyl oleate for the ricinoleic acid of Example 1 above.

Example 5

React one pound mol of triethanolamine with one pound mol of ethylene oxide at 160° C. until the latter is completely absorbed. Substitute the etherized amine so produced for triethanolamine in the preceding four examples.

Example 6

Use two pound mols of ethylene oxide in the foregoing example, instead of one. Use the etherized amine in Examples 1–4 above, instead of triethanolamine.

Example 7

React one pound mol of diamylamine with one pound mol of ethylene oxide at 160° C. until the oxide is completely absorbed. Use the product instead of triethanolamine in Examples 1–4 above.

Example 8

React one pound mol of castor oil with three pound mols of triethanolamine for 10–25 hours at 180–250° C.

Example 9

React one pound mol of castor oil with six pound mols of triethanolamine for 10–25 hours at 180–250° C.

Example 10

React one pound mol of castor oil with nine pound mols of triethanolamine for 10–25 hours at 180–250° C.

Example 11

React one pound mol of commercial tallol with one pound mol of triethanolamine for 10–25 hours at 180–250° C. "Pound mol" is used here to mean one equivalent weight of tallol, in pounds, as determined from Saponification Number.

Example 12

React one pound mol of commercial tallol with two pound mols of triethanolamine for 10–25 hours at 180–250° C., calculating the tallol amount as in the preceding example.

Example 13

React one pound mol of commercial tallol with three pound mols of triethanolamine, proceeding as in Example 11 above.

Example 14

Proceed as in Example 1 above, but substituting for triethanolamine the amine prepared from triethanolamine and glycerol as recited in U. S. Patent No. 2,293,494, to DeGroote and Keiser, dated August 18, 1942, said amine having the following composition:

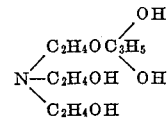

Example 15

React one pound mol of diethylene triamine with four mols of ethylene oxide at 160° C. till absorption of the oxide is complete. Substitute this amine for triethanolamine in Examples 1, 8, and 12, above.

Example 16

Prepare amines of the following composition:

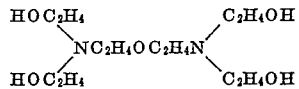

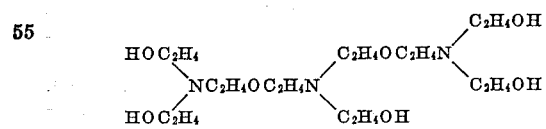

by heating commercial triethanolamine for from 5 to 20 hours at from 200 to 250° C. React three "pound mols" of either of these polyamines with one pound mol of castor oil at from 180 to 250° C. for from 10 to 25 hours. Calculate "pound mol" of the amine from its observed average molecular weight, or by any other suitable procedure.

Example 17

Repeat Example 16 above but using one "pound mol" of either of the amines there recited and one pound mol of commercial tallol, determining the equivalent weight of the latter from Saponification Number.

Other suitable examples of the acylated aminoalcohol intermediate I employ to produce my reagents are found in my U. S. Patent No. 2,470,829, dated May 24, 1949. In all cases, to be usable in the present application, such acylated aminoalcohol product must be oxyalkylation-susceptible, except under the special conditions set out just below.

In all cases, my finished reagents are required to contain oxyalkylene radicals, as well as an acyl radical and a residue of an aminoalcohol. It is immaterial, usually, whether oxyalkylation precedes or follows acylation. If oxyalkylation precedes acylation, then the acylated oxyalkylated aminoalcohol need not be oxyalkylation-susceptible, because it is not required to be subjected to further oxyalkylation. It is usually possible partially to oxyalkylate the aminoalcohol, then acylate it, and then proceed with a second oxyalkylation of the acylated material. Where the acylation step results in the binding of the last oxyalkylation-susceptible radical or group, it is obviously impossible subsequently to oxyalkylate the material. In general, I prefer to prepare the acylated aminoalcohol first, and subsequently to oxyalkylate it, as described below.

The reagents which are employed in my process of inhibiting foam do not include all oxyalkylated and acylated aminoalcohols. I have found that where the oxyalkylated and acylated aminoalcohol contains at least one-half by weight of a multiple of the oxypropylene radical, $C_3H_6O$, the product is an especially effective anti-foamer or foam inhibitor. It is to this class of oxyalkylated and acylated aminoalcohols that I wish to limit myself in this application. My reagents may include other oxyalkylene radicals derivable from ethylene oxide, butylene oxide, glycid or methylglycid, in addition to the oxypropylene radicals; but they must be predominantly composed of a multiple of the oxypropylene radical.

Summarizing the foregoing description, my process for inhibiting foam is characterized by subjecting a foaming composition to the action of a reagent including an oxyalkylated and acylated aminoalcohol, said oxyalkylation being accomplished by reaction with a member selected from the class consisting of ethylene oxide, propylene oxide, butylene oxide, glycid, and methylglycid; which oxylakylated and acylated aminoalcohol contains at least one-half by weight of a multiple of the divalent oxypropylene group, $C_3H_6O$.

More specifically defined, my reagent is an oxyalkylated and acylated aminoalcohol, the parent aminoalcohol having the formula:

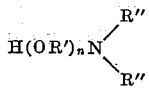

said derivative being such that there is introduced into said aminoalcohol formula at least one occurrence of the radical RCO, which is the acyl radical of a monocarboxy detergent-forming acid having at least 8 and not more than 32 carbon atoms; the amino nitrogen atom is basic; R″ is a member of the class consisting of alkanol radicals, aminoalkanol radicals, and polyaminoalkanol radicals, in which polyaminoalkanol radicals the amino nitrogen atoms are united by divalent radicals selected from the class consisting of alkylene radicals, alkyleneoxyalkylene radicals, hydroxyalkylene radicals, and hydroxyalkylene-oxyalkylene radicals, and all remaining amino nitrogen valences are satisfied by hydroxyalkyl radicals, including those in which the carbon atom chain is interrupted at least once by an oxygen atom; R′ is an alkylene radical having at least 2 and not more than 10 carbon atoms; $n$ is a small whole number varying from 1 to 10; and RCO is a substituent for a hydroxyl hydrogen atom; oxyalkylation being accomplished by means of an alphabeta alkylene oxide selected from the class consisting of ethylene oxide, propylene oxide, butylene oxide, glycid and methylglycid; the molecular weight of said compound exclusive of oxyalkylation-introdued elements being at least 273 and not more than 4,000; with the proviso that at least one-half by weight of the oxyalkylated and acylated aminoalcohol consist of a multiple of the oxypropylene group, $C_3H_6O$.

Oxyalkylation is a conventionally employed process today, and need not be described in detail. It is sufficient to say that if a compound contains a hydrogen atom attached to oxygen, nitrogen, or sulfur, it is ordinarily susceptible to reaction with an alkylene oxide of the foregoing class. In oxyalkylation, the oxide is absorbed and appears as one or more oxyalkylene groups between the labile hydrogen atom and the oxygen, nitrogen, or sulfur atom to which said hydrogen atom was originally attached. Long oxyalkylene group chains are therefore readily introducible into oxyalkylation-susceptible compounds in this manner. The oxyalkylation process is facilitated by the presence of an alkaline catalyst, but where the initial reactant is basic the catalyst's importance is minimized. Many oxyalkylations are possible to achieve under such circumstances without any catalyst being present.

U. S. Patent No. 2,499,365, dated March 7, 1950, to DeGroote and Keiser, gives an exhaustive statement of oxyalkylation, its reactants, and procedures. While the oxyalkylation-susceptible reactants there were synthetic resins, the statements are broadly relevant here, and reference is made to them.

Oxyalkylations may be conducted at quite different temperatures. The lower temperature limit, of course, is the temperature which just barely sustains reaction and absorption of the alkylene oxide. Higher temperatures produce greater reaction rates, until dangerously rapid, exothermic reactions are observed, especially with a reactant like glycid. Ordinarily, there is no appreciable difference in oxyalkylated product when different temperatures are employed in the oxyalkylation. I have found, however, that sometimes it is definitely desirable to conduct the oxyalkylation step at a lower temperature and for a longer time than at a higher temperature for a shorter time. More rarely, the opposite holds true. All such variations lie within the scope of my invention.

As a preferred example of my reagent, the following may be recited as illustrative:

Castor oil, 925 grams, is reacted with triethanolamine, 1075 grams, for 16 hours at 250° C. with stirring. The acylated aminoalcohol so produced, 250 grams, is charged into an autoclave along with 250 grams of aromatic petroleum solvent. After adding 13 grams of 50% caustic soda solution, the water of solution is distilled. The mixture is heated to 110–115° C., and propylene oxide is passed into the mixture until a total of 400 grams has been absorbed. In other cases, using the same technique the amount of propylene oxide employed was, respectively, 600, 800, 1,000 and 2,000 grams. All the products were effective anti-foamers.

A second preferred example is as follows: Tallol, 305 grams, is reacted with triethanolamine, 730 grams, for 18 hours at about 250° C., with stirring. The acylated aminoalcohol so produced, 250 grams, was charged into an autoclave, along with 250 grams of aromatic petroleum solvent. Caustic soda solution, 15 grams, was added, and the water of solution distilled. Then, propylene oxide was introduced at a temperature of 115° C. until a total of 400 grams had been absorbed. In other runs, 600, 800, 1,000 and 2,000 grams, respectively, of propylene oxide were used. All the products were effective foam inhibitors.

To illustrate the sort of reagents which contain oxyalkylene groups other than the oxypropylene group, as shown in the foregoing preferred examples, the following may be recited:

Into the above product prepared from castor oil and triethanolamine, 250 grams, introduce 600 grams of propylene oxide, as before. Then introduce 75 grams of ethylene oxide at a temperature of about 165° C. and a pressure not exceeding about 50 p. s. i. g.

Similarly, other alkylene oxides may be reacted with the acylated aminoalcohol or its oxypropylated derivative, to produce the final product.

The basic acylated aminoalcohols employed to produce my reagents may have molecular weights ranging from 273 to about 4,000, in monomeric form. The minimum figure is derived by considering the amino-alcohol reactant to be triethanolamine and the acylating agent to be a $C_8$ unsaturated monocarboxy acid. To produce a compound of maximum molecular weight, the acylating agent could furnish three $C_{31}H_{63}CO$ radicals; the element, OR', could be 10 times $OC_{10}H_{20}$; and R'' could be a polyaminoalcohol radical, rather than the simple alkanol radical, $HOC_{10}H_{20}$. Such largest elements add up to produce a product of molecular weight 4,000, or slightly higher.

My present class of reagents may be used alone in foam inhibition, or they may be used in admixture with any other effective and compatible anti-foamer, e. g., with the reagents described and claimed in my U. S. Patent No. 2,408,527, dated October 1, 1946, those described and claimed in my co-pending application, Serial No. 775,145, filed September 19, 1947, now Patent 2,622,070, granted December 16, 1952, or those described and claimed in my co-pending application, Serial No. 180,691, filed August 21, 1950, now Patent 2,622,069, granted December 16, 1952.

It is usually convenient to dilute my reagents during manufacture or before use with some suitable solvent. Solvents generally suitable for incorporation into my reagent include: water; petroleum hydrocarbons, like gasoline, kerosene, stove oil, aromatic solvent; coal tar products, such as benzene, toluene, xylene, tar acid oil, cresol, anthracene oil; alcohols, particularly aliphatic alcohols like methyl, ethyl, isopropyl, butyl, hexyl, octyl, etc. Miscellaneous solvents, such as pine oil, carbon tetrachloride, etc., may be employed. Sometimes other factors such as whether it imparts an objectionable odor to the defoamed composition or to the products into which it finds its way will determine the choice of solvent. In general, the amounts of finished anti-foamer reagent employed are so small that considerable tolerance of undesirable properties in a solvent exists.

The mixture of active ingredients and solvents is stirred until homogeneous. I prefer to employ a petroleum distillate in the proportion of 25 to 50% of the finished product, by volume, although water is an excellent solvent in some instances.

I desire to point out that the superiority of the reagent contemplated in my process is based upon its ability to reduce or destroy foam, or to prevent foam formation, in certain foaming or potentially foaming compositions more advantageously and at lower cost than is possible with other reagents or processes. In certain instances, it has been found to destroy or reduce foams or prevent their formation, which foams were not economically or effectively reducible or preventable by any other known means.

My reagents are useful in controlling foams in many different types of system, aqueous and non-aqueous. They will control foams encountered in the manufacture of alkaline hypochlorite bleaches. They are effective in controlling foam in petroleum refining operations. They are effective in inhibiting foam in a gas-treating system, in which a mixture of glycols and alkanolamines is used to dehydrate and purify natural gas.

I have applied my reagents to the control of foam in protein adhesives solutions, such as casein and soybean adhesives, as used in the plywood industry. Latex adhesives, printing inks, aqueous emulsion paints, all produce foams which are amenable to my reagents.

In the foregoing description, I have made it clear that my reagents may be used to reduce, destroy, or prevent foam. In the appended claims I have used the word "inhibit" to include all these corrective and preventive aspects of my process and reagents.

The procedures employed in practising my process are numerous. The following description will illustrate several techniques commonly employed. It should be understood that the claims are not limited to the procedures described; and that my process consists broadly in bringing into contact by any suitable means my reagent and the foam or the potentially foaming composition.

In controlling foam in a glycol-amine gas treating plant handling natural gas, the glycol-amine mixture had a volume of about 2,000 gallons and make-up was about 2,000 gallons a month. My first preferred reagent was injected into the liquid mixture in the return line from the stripping operation, by means of an electrically-powered proportioning pump of conventional design. The feed rate was less than 1 quart daily. Foam difficulties in the system were satisfactorily controlled by this procedure.

In sewage plants, for example, in activated-sludge-process plants, foam is frequently a serious problem in aeration basins and elsewhere. In one such plant, I have demonstrated that my reagent will control foam when sprayed into the head of foam, or when sprayed into or simply poured into the liquid in such basin. The foam-inhibiting effect appears to persist quite satisfactorily.

Determination of the optimum or minimum amount of my foam-inhibiting reagent to be used in any application may be accomplished in different ways. Small portions of the potentially foaming liquid may be filled into test bottles, different small proportions of my reagent added, and the chemicalized samples shaken for a short time. Simple observation of the relative speed and completeness of foam destruction should permit selection of the best reagent proportion to be applied on the large scale. The easiest way to determine the amount of my reagent required is to introduce it into the foaming or potentially foaming liquid in a fairly large proportion, e. g., 1%, and then to reduce the reagent feed rate until foam destruction is just being accomplished satisfactorily. Usually foam destruction is directly proportional to the amount of reagent used, at least up to about 1% of reagent. In a few instances, it may be found that using more or less reagent than an optimum proportion will give inferior results.

If the proportions of reagent to be employed in the above test are very small, it may be desirable to determine the optimum proportions of foaming composition and anti-foamer by introducing the latter into the sample of foaming liquid in the form of a solution in a suitable solvent.

Throughout this specification, I have shown that my process is equally applicable to systems in which a foam is already in existence and to systems which are potentially foaming compositions, in that they have the property of producing foams when agitated or mixed with air or some other suitable gas. Destruction, reduction and prevention are substantially equivalent actions. It is impossible to determine whether the reagent does in fact prevent the formation of the initial laminae of foam or whether such initial laminae are destroyed by the reagent before subsequent laminae of sufficient stability to produce a foam can be superimposed thereon. By "foaming composition" in the appended claims, I mean a composition which is either actually foaming or which is capable of producing a foam under suitable conditions, e. g., by simply passing air through it.

In most instances, my reagent is effective to the extent that it destroys an existing foam substantially completely. In some instances, as when too little reagent is used, foam reduction may be slow or even incomplete. I intend that this description and my invention relate both to complete destruction and to partial destruction of foams.

The proportions of my reagent required to be employed appear to vary widely. However, I wish to limit my invention to the use of my reagent in amounts 1% or less of the foaming composition. Usually, the amounts required will be between 0.1% and 0.0001%.

I have stated above that my present reagents may be used in conjunction with any other effective and compatible anti-foamer. It should also be stated that they are useful in conjunction with foam-inhibiting processes which are mechanical or electrical in character, rather than chemical. For example, some foams may be effectively destroyed by water sprays or jets. Incorporation of a small proportion of my reagents into such water sprays increases their effectiveness. U. S. Patent No. 2,240,495, to Dillon et al., dated May 6, 1941, relates to a process for resolving foam by means of a high electrical potential. Incorporation of a small proportion of my present reagents into the foaming liquid increases the effectiveness of such electrical processes.

Having thus described my invention, what I claim as novel and desire to secure by Letters Patent is:

1. A process for inhibiting foam, characterized by subjecting a non-detersive foaming composition to the action of not more than 1 per cent of an oxyalkylated and acylated material selected from the group consisting of triethanolamine and its condensation polymers, said oxyalkylated and acylated material being such that there is introduced into the triethanolamine structure as a substituent for a hydroxyl hydrogen atom at least one occurrence of the radical RCO, which is the acyl radical of a monocarboxy detergent-forming acid having 8 to 32 carbon atoms, and a plurality of oxyalkylene groups selected from the class consisting of oxypropylene and mixtures of oxypropylene and oxyethylene groups, with the proviso that the molecular weight of said material exclusive of oxyalkylation-introduced elements be at least 273 and not more than 4,000 and with the further proviso that at least one-half by weight of the oxyalkylated and acylated material consist of a multiple of the oxypropylene group, $C_3H_6O$.

2. The process of claim 1 wherein RCO is an unsaturated higher fatty acid acyl radical having 18 carbon atoms.

3. The process of claim 1 wherein RCO is an acyl radical derived from tallol.

4. The process of claim 1 wherein RCO is an acyl radical derived from castor oil.

5. The process of claim 1 wherein the molecular weight of the acylated material prior to oxyalkylation is less than 1,000.

References Cited in the file of this patent
UNITED STATES PATENTS 2,324,490     DeGroote et al.            July 20, 1943